United States Patent [19]

Streng

[11] 4,229,197
[45] Oct. 21, 1980

[54] METHOD FOR MAKING MULTIPLE OPTICAL CORE FIBER

[75] Inventor: DeWayne A. Streng, Troutville, Va.

[73] Assignee: International Telephone and Telegraph Corporation, New York, N.Y.

[21] Appl. No.: 914,470

[22] Filed: Jun. 12, 1978

[51] Int. Cl.² .................................................. C03B 37/02
[52] U.S. Cl. ..................................... 65/4 B; 65/3 A; 65/42; 65/110
[58] Field of Search ............... 65/3 A, 4 B, 2, 42, 65/55, 110

[56] References Cited

U.S. PATENT DOCUMENTS

| | | | |
|---|---|---|---|
| 3,277,564 | 10/1966 | Webber et al. | 65/3 A X |
| 3,455,666 | 7/1969 | Bazinet | 65/4 B |
| 3,455,667 | 7/1969 | Snitzer et al. | 65/4 B |
| 3,535,017 | 10/1970 | Miller | 65/4 B X |
| 3,656,925 | 4/1972 | Dunlap | 65/4 B X |
| 3,837,830 | 9/1974 | Eberhart | 65/110X |
| 3,930,714 | 1/1976 | Dyott | 65/3 A X |
| 4,011,007 | 3/1977 | Phoneuf et al. | 65/4 B X |
| 4,154,591 | 5/1979 | French | 65/110 X |

*Primary Examiner*—Robert L. Lindsay, Jr.
*Attorney, Agent, or Firm*—John T. O'Halloran; Peter C. Van Der Sluys

[57] ABSTRACT

A multiple optical core fiber and method for manufacturing it. Two or more chemical vapor deposition type preforms are fused with a hydrogen-oxygen torch and then etched in a solution of 50% hydrofluoric and 50% nitric acid. A hollow quartz tube is subjected to internal gas pressure while a hydrogen-oxygen torch is passed along it. This expands and cleans the tube. The chemical vapor deposition preforms are inserted within the expanded tube which is again subjected to the torch to collapse it about the preforms. A nearly solid glass rod with two or more optical waveguide cores is thereby formed. This multiple core preform may then be drawn into a multiple core fiber which can be utilized for the transmission of light pulses.

7 Claims, 6 Drawing Figures

METHOD FOR MAKING MULTIPLE OPTICAL CORE FIBER

BACKGROUND OF THE INVENTION

The field of the invention relates to optical fibers used for the transmission of light pulses, and in particular to preforms or fibers having multiple optical cores.

Glass fibers have conventionally been formed by softening and then drawing high-silica-content glass rods known as "preforms". The center of the preform is made of a glass composition desired for the core of the fiber. It is usually nearly pure silica with a few percent of a dopant. The outer portion of the preform is composed of glass suitable for the fiber cladding. An appropriate dopant, such as boron, Trichloride is injected into silica tetrachloride to yield the cladding material. The modified chemical deposition process has been found to be most advantageous in the fabrication of high-silica preforms. It is comparatively simple and allows the injection of relatively high percentages of dopants. The resultant product is known as a CVD preform.

Use of two slightly different types of glass for the core and cladding materials give the core a slightly higher index of refraction than the cladding. The different indices allow light to be reflected along the entire length of an optical glass fiber.

It is often desirable to be able to simultaneously send signals in both directions through a cable. This has traditionally required the use of bidirectional couplers in conjunction with the optical cable. It is also necessary in many circumstances to determine whether a cable has been tampered with.

A tamper-proof cable has been proposed which comprises concentric layers of core and cladding material, respectively. A signal is transmitted through the central core which is encircled by a first layer of cladding material. A monitoring signal is transmitted through a layer of core material disposed exteriorly and concentric to the first layer of cladding. This second core is also sheathed by cladding material.

If an attempt is made to tamper with the cable, the monitoring signal will be interrupted or attenuated. This allows the detection of such tampering.

SUMMARY OF THE INVENTION

The invention concerns a multiple optical core preform which can be drawn into a multiple core fiber for the transmission of light pulses. In this manner, a cable may be provided which is tamper-proof and allows signal transmission in both directions without the need for bi-directional couplers. A method for producing such a preform is also disclosed.

The method according to the invention commences with the fusion of a plurality of preforms. The preforms may be fabricated by the chemical vapor deposition process and are accordingly termed CVD preforms. A hydrogen-oxygen torch may be employed to fuse the preforms.

The preforms are then etched with an acidic solution to clean their outside surface, rinsed with water and methanol, respectively, and dried.

A hollow fused silica tube is internally etched and then mounted on a modified glass lathe. Prior to mounting, fused silica tubes having larger and smaller diameters than the hollow tube are secured to either end of this tube. The interiors of the three tubes are in fluid communication with each other. The smaller tube is connected to the head-stock of the lathe, and the larger to the tailstock.

Gas is then directed into the hollow structure from the end having the small tube. The large end is connected to a back pressure device having a slight leakage which maintains the interior of the tube assembly under pressure with a high purity oxygen gas. A hydrogen-oxygen torch is passed along the middle tube so that the gas pressure causes it to expand slightly. The back pressure and torch may then be removed.

The CVD preforms are inserted into the middle tube through the large tube. The torch is again applied to collapse the middle tube around the preforms, thereby forming a nearly solid glass rod with a plurality of optical waveguide cores passing therethrough.

The multiple core preform is cut at the joint between the collapsed structure and the large tube, and a fused silica rod is joined to the preform at this end. The small tube is severed in the same manner.

The fused silica rod is chucked to the draw tower of a fiberdrawing apparatus, and a multiple-core optical fiber is thereby formed by a drawing step.

If at least three CVD preforms are incorporated within the structure to produce a triple core preform, a tamper-proof cable may be formed which is also capable of simultaneously transmitting signals in both directions without the need for bidirectional couplers. Signals may be transmitted in one direction through one core, in the other direction through a second core, and a monitoring signal may be sent through a third core.

DESCRIPTION OF THE INVENTION

The multiple core preform may comprise two or more optical cores for the transmission of light energy. Since there are a number of advantages to fibers having three optical cores, the invention shall be described in terms of such a construction. It should be recognized, however, that it may be desirable to utilize a different number of optical cores depending upon the intended use of the fiber. Other parameters may also be varied in the method according to the invention by utilizing equivalent steps or materials.

Figure 1:
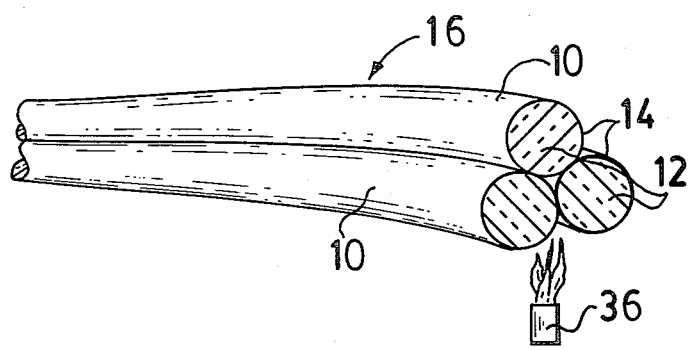
FIG. 1 is a perspective view of three preforms which are fused together.

According to a successful application of the invention, three step index (chemical vapor deposition) type preforms 10 are employed. The preforms comprise inner core 12 and outer cladding 14 portions as are known to the art. They are arranged in a bundle and held together by tape. A hydrogen-oxygen hand torch 36 may then be applied for fusing them together at their ends (See FIG. 1).

The fused bundle 16 is etched in a solution of 50% hydrofluoric acid and 50% nitric acid for thirty minutes in order to clean the outside surface. The preforms are then rinsed with water, then methanol, and subsequently dried.

Figure 2:
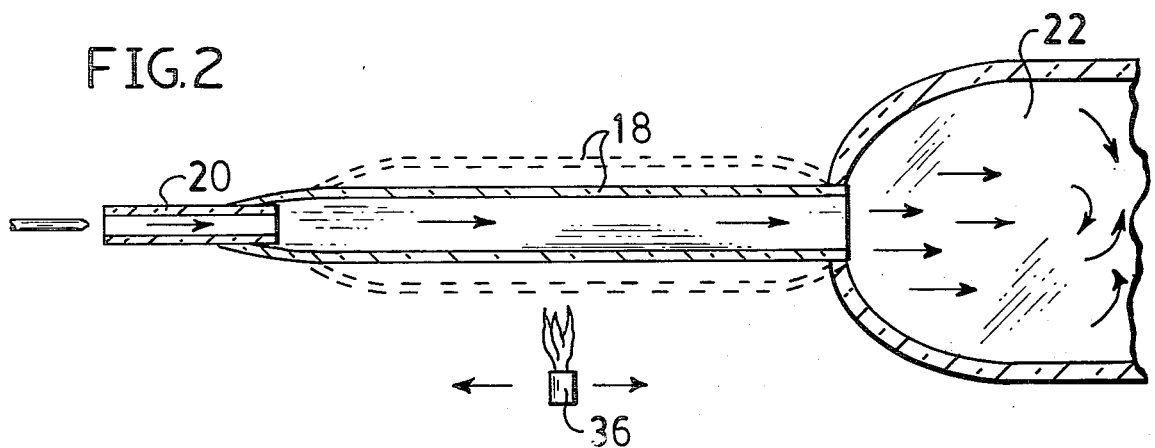
FIG. 2 is a sectional view of three fused silica tubes, glass blown to each other, having the middle tube subjected to heat treatment while internal pressure is applied.

A fused silica tube 18 (approximately twenty inches long and having a twenty millimeter outside diameter and an eighteen millimeter inside diameter) is mounted on a modified glass lathe (not shown) after being internally etched using the same solution and procedures applied to the preforms. The tube is mounted by first attaching a length of eight millimeter (outside diameter) fused silica tube 20 to one end of the twenty millimeter tube while gas is blown through the tubes. In this manner, the tubes merge together having a hollow interior in fluid communication with each other. A similar procedure is employed for connecting a thirty-eight millimeter fused silica tube 22 to the opposite end. The resulting structure is shown in FIG. 2. The eight and thirty-eight millimeter tubes are connected to the headstock and tail-stock of the lathe, respectively.

High purity oxygen gas is directed into the hollow structure from the eight millimeter end while the larger end is connected to a back pressure device (not shown) having a slight leakage to maintain the interior of the tube assembly under pressure. A hydrogen-oxygen torch is passed along the twenty millimeter tube so that the gas pressure causes it to expand slightly. (The expansion of the tube in the drawing is exaggerated for purposes of illustration). The torch and back pressure may then be removed. In addition to expanding the tube, this procedure also serves as a cleaning step with the oxygen and heat causing any contaminants within the tube to be consumed and removed.

Figure 3:
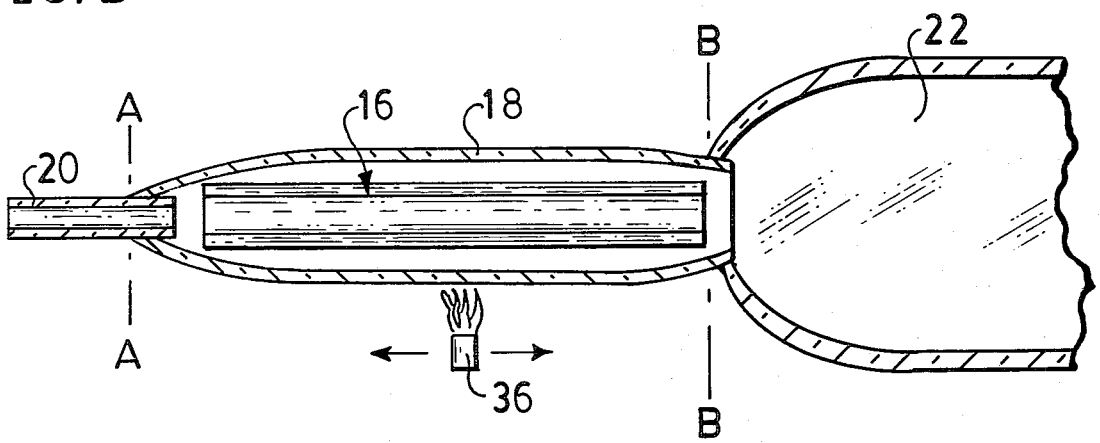
FIG. 3 is a sectional view of the operation whereby a fused silica tube is collapsed about three fused preforms.
Figure 5:
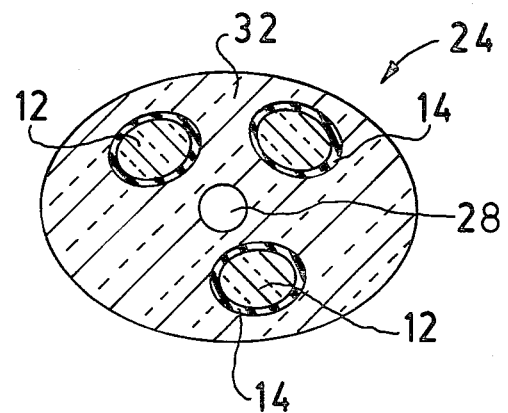
FIG. 5 is a cross sectional view of the multiple core preform shown in FIG. 4.
Figure 6:
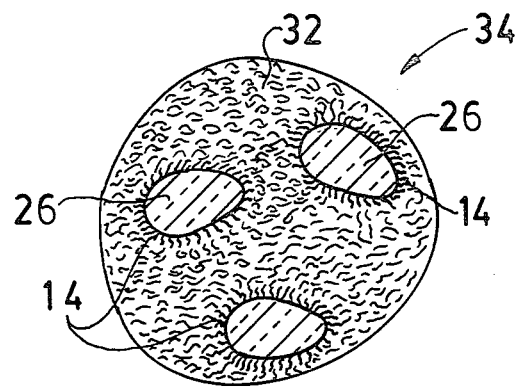
FIG. 6 is a cross sectional view of a multiple optical core fiber.

The CVD preforms are then inserted into the twenty millimeter tube through the thirty-eight millimeter tube as illustrated in FIG. 3. The traversing hydrogen-oxygen torch is again applied to collapse the twenty millimeter tube around the preforms. The resulting structure is a nearly solid glass rod or preform 24 with three optical waveguide cores 12 passing therethrough. As shown in FIG. 5, a slight uncollapsed area 28 may remain at the center of the preform.

The triple core preform 24 is then cut with a hydrogenoxygen torch at the glass joint between the collapsed structure and the thirty-eight millimeter tube. This is designated by line B—B. A piece of eight millimeter fused silica rod 30 is joined to the preform 24 at this end. The preform is then cut in the same manner at the joint between itself and the eight millimeter tube, shown along line A—A. It can then be removed from the lathe for subsequent use in forming a triple core optical fiber.

Figure 4:
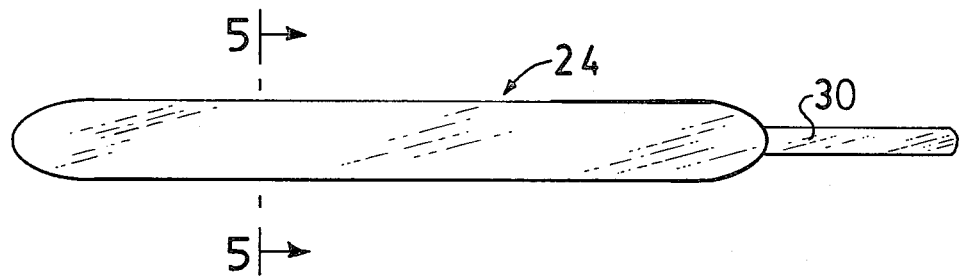
FIG. 4 is side view of a preform with a rod attached thereto.

FIGS. 4 and 5 illustrate the structure which is obtained at this point. The preform 24 includes an outer matrix 32 of fused silica glass from the CVD preforms and the collapsed tube. The fused silica rod 30 is secured to one end of the preform. Three optical waveguide cores 12 pass through the structure surrounded by an appropriate cladding material 14. The slight uncollapsed area is designated by numeral 28.

The rod 30 is chucked to the draw tower of a fiber-drawing apparatus, thereby allowing one to use the entire length of the preform for forming optical fibers. The preform may be generally viewed as a scaled-up model of the fiber desired, and the resulting fiber 34 is illustrated in FIG. 3. It is apparent from this Figure that the uncollapsed area 28 is eliminated during the drawing step. The fiber 34 includes the optical waveguide cores 26 sheathed by cladding material 14 and fused silica 32 from the collapsed tube and CVD preforms. A polymeric coating (not shown) may subsequently be applied to the fiber.

The triple-core optical fiber may be employed for duplex operations (i.e., transmitting telecommunications in both directions simultaneously). Bi-directional couplers are unnecessary as two different cores are employed to send the light waves in either direction.

The third core may be used for transmitting a steadystate or monitoring signal. If this signal is interrupted, one will know that the fiber "wire" has either been damaged or tampered with.

Those skilled in the art will be likely to find other uses for a multiple optical core fiber. Equivalent steps for constructing such a fiber are also within contemplation. Accordingly, the above description is intended to be illustrative rather than limiting, and the scope of the invention to be interpreted in light of the appended claims.

What is claimed is:

1. A method of producing a multiple optical core preform which can be drawn into a light-conducting fiber, comprising the steps of:
   providing a plurality of preforms having central portions of fiber core material and outer portions of fiber cladding material;
   assembling said preforms into a bundle;
   fusing said bundle of preforms;
   providing a fused silica tube having a first end and a second end;
   expanding said fused silica tube by means of internal gas pressure and heat;
   inserting said fused bundle into said expanded silica tube; and
   collapsing said silica tube about said bundle to form a substantially solid multiple optical core preform.

2. A method as described in claim 1 further including the steps of attaching a second tube to said first end of said fused silica tube; attaching a third tube to said second end of said fused silica tube, said second and third tubes having, respectively, larger and smaller diameters than said fused silica tube, the second and third tubes being attached such that the interiors of the tubes are in fluid communication with each other; directing gas into said third tube to maintain the interiors of the tubes under pressure; and applying heat to said fused silica tube to expand it.

3. A method for producing a multiple optical core fiber, comprising the steps of:
   providing a plurality of preforms having central portions of fiber core material and outer portions of fiber cladding material;
   assembling said preforms into a bundle;
   fusing said bundle of preforms;
   providing a fused silica tube having a first end and a second end;
   extending said fused silica tube by means of internal gas pressure and heat;
   inserting said fused bundle into said expanded silica tube;
   collapsing said tube about said bundle to form a substantially solid multiple optical core preform; and
   drawing said preform to form a multiple optical core fiber.

4. A method as described in claim 3 further including the steps of attaching a second tube to said first end of said fused silica tube; attaching a third tube to said second end of said fused silica tube, said second and third tubes having, respectively, larger and smaller diameters than said fused silica tube, the second and third tubes being attached such that the interiors of the tubes are in fluid communication with each other; directing gas into said third tube to maintain the interiors of the tubes under pressure; and applying heat to said fused silica tube to expand it.

5. A method as described in claim 1 further including the step of attaching a rod to one end of the multiple core preform which may be chucked to a draw tower.

6. A method as described in claim 3 further including the step of etching said fused silica tube prior to expanding it.

7. A method as described in claim 3 further including the step of etching said preforms prior to its insertion within the fused silica tube.

* * * * *